US010365654B2

(12) United States Patent
Wood et al.

(10) Patent No.: US 10,365,654 B2
(45) Date of Patent: Jul. 30, 2019

(54) SYSTEM FOR SAFE PASSENGER DEPARTURE FROM AUTONOMOUS VEHICLE

(71) Applicant: Uber Technologies, Inc., San Francisco, CA (US)

(72) Inventors: Matthew Shaw Wood, Pittsburgh, PA (US); Scott C. Poeppel, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 103 days.

(21) Appl. No.: 15/475,881

(22) Filed: Mar. 31, 2017

(65) Prior Publication Data

US 2018/0284793 A1 Oct. 4, 2018

(51) Int. Cl.
*G05D 1/00* (2006.01)
*G05D 1/02* (2006.01)
(Continued)

(52) U.S. Cl.
CPC .......... *G05D 1/0223* (2013.01); *B60K 28/12* (2013.01); *B60W 10/04* (2013.01); *B60W 10/20* (2013.01); *B60W 10/30* (2013.01); *B60W 30/18009* (2013.01); *G05D 1/0055* (2013.01); *G05D 1/0088* (2013.01); *B60W 2420/42* (2013.01);
(Continued)

(58) Field of Classification Search
CPC ........ G05D 1/0223; E05F 15/73; E05F 15/40; E05Y 2900/531; B60J 5/04; B60W 10/18; B60W 30/14
See application file for complete search history.

(56) References Cited

U.S. PATENT DOCUMENTS

2015/0248131 A1 9/2015 Fairfield et al.
2016/0298758 A1* 10/2016 Fujiyoshi ............ F16H 61/0204
(Continued)

FOREIGN PATENT DOCUMENTS

DE 10 2005 041 853 3/2007
DE 10 2009 055 972 6/2011
EP 2314490 4/2011

OTHER PUBLICATIONS

International Search Report with Written Opinion for PCT/US2018/024480 dated Jun. 22, 2018, 11 pages.

*Primary Examiner* — Anne M Antonucci
*Assistant Examiner* — Renee LaRose
(74) *Attorney, Agent, or Firm* — Dority & Manning, P.A.

(57) ABSTRACT

Systems and methods for controlling an autonomous vehicle based on a passenger-initiated action are provided. In one example embodiment, a computer implemented method includes detecting, by one or more computing devices on-board an autonomous vehicle, a first status change of a vehicle door. The first status change is associated with a first user action associated with the vehicle door. The method includes detecting a second status change of the vehicle door. The second status change is associated with a second user action associated with the vehicle door. The method includes determining one or more vehicle actions based at least in part on at least one of the first status change or the second status change associated with the vehicle door. The method includes providing one or more control signals to one or more systems on-board the autonomous vehicle to implement the vehicle actions.

20 Claims, 6 Drawing Sheets

(51) Int. Cl.
   *B60W 10/30*   (2006.01)
   *B60W 10/20*   (2006.01)
   *B60W 10/04*   (2006.01)
   *B60W 30/18*   (2012.01)
   *B60K 28/12*   (2006.01)
(52) U.S. Cl.
   CPC ..... *B60W 2420/52* (2013.01); *B60W 2510/30* (2013.01); *B60W 2540/28* (2013.01); *B60W 2600/00* (2013.01); *B60Y 2302/05* (2013.01); *G05D 2201/0213* (2013.01)

(56) References Cited

U.S. PATENT DOCUMENTS

2018/0148007 A1* 5/2018 Gage ..................... B60R 16/037
2018/0188726 A1* 7/2018 Newman .............. G05D 1/0055

* cited by examiner

SYSTEM FOR SAFE PASSENGER DEPARTURE FROM AUTONOMOUS VEHICLE

FIELD

The present disclosure relates generally to controlling an autonomous vehicle such that a passenger can safely exit the autonomous vehicle while it is operating in an autonomous mode.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling an autonomous vehicle based on a passenger-initiated action. The method includes detecting, by one or more computing devices on-board an autonomous vehicle, a first status change of a vehicle door. The first status change is associated with a first user action associated with the vehicle door. The method includes detecting, by the one or more computing device, a second status change of the vehicle door. The second status change is associated with a second user action associated with the vehicle door. The first user action and the second user action are performed by one or more passengers of the autonomous vehicle. The method includes determining, by the one or more computing devices, one or more vehicle actions based at least in part on at least one of the first status change or the second status change associated with the vehicle door. The method includes providing, by the one or more computing devices, one or more control signals to one or more systems on-board the autonomous vehicle to implement the vehicle actions.

Another example aspect of the present disclosure is directed to a computing system for controlling an autonomous vehicle based on a passenger-initiated action. The computing system includes one or more processors on-board an autonomous vehicle and one or more tangible, non-transitory, computer readable media on-board the autonomous vehicle that collectively store instructions that when executed by the one or more processors cause the computing system to perform operations. The operations can include detecting a first status change associated with a vehicle door. The first status change is associated with a first user action performed by one or more passengers of the autonomous vehicle. The operations include detecting a second status change associated with the vehicle door. The second status change is associated with a second user action performed by one or more passengers of the autonomous vehicle. The operations include determining one or more vehicle actions based at least in part on at least one of the first status change or the second status change associated with the vehicle door. The operations include providing one or more control signals to implement the vehicle actions.

Yet another example aspect of the present disclosure is directed to an autonomous vehicle. The autonomous vehicle includes a vehicle door, one or more on-board systems, one or more processors, and one or more tangible, non-transitory, computer readable media that collectively store instructions that when executed by the one or more processors cause the computing system to perform operations. The operations include detecting a first status change of the vehicle door. The first status change is associated with a first actuation of an interface associated with the vehicle door. The operations include detecting a second status change of the vehicle door. The second status change is associated with a second actuation of the interface associated with the vehicle door. The operations include determining one or more vehicle actions based at least in part on at least one of the first status change and the second status change associated with the vehicle door. The operations include providing one or more control signals to the one or more systems on-board the autonomous vehicle to implement the vehicle actions.

Other example aspects of the present disclosure are directed to systems, methods, vehicles, apparatuses, tangible, non-transitory computer-readable media, and memory devices for controlling an autonomous vehicle based on a passenger-initiated action.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
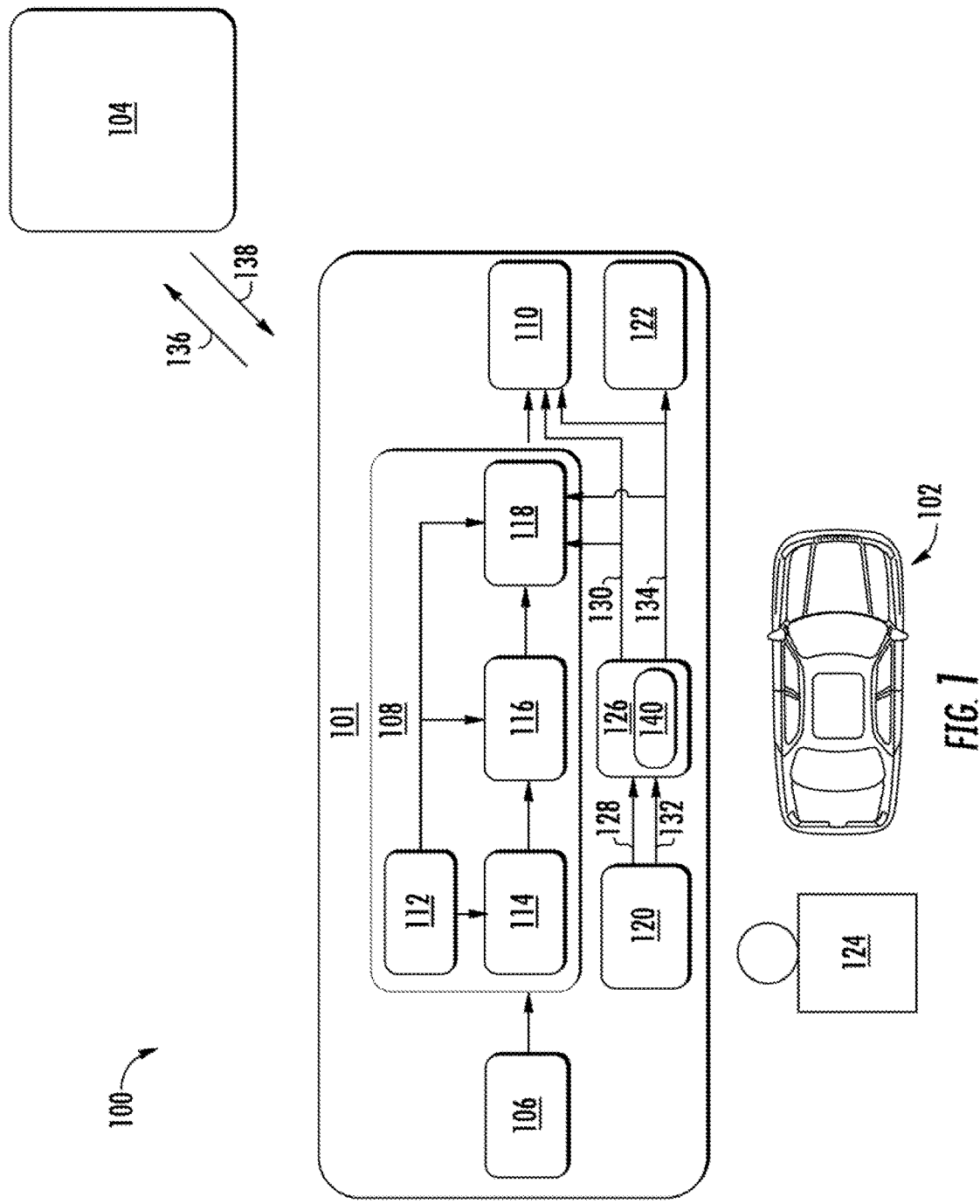
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling an autonomous vehicle such that a passenger can safely exit the autonomous vehicle while it is operating in an autonomous mode. For instance, an autonomous vehicle can drive, navigate, operate, etc. with minimal and/or no interaction from a human driver. While the autonomous vehicle is operating in this autonomous mode, a passenger may desire to exit the vehicle. The passenger may take one or more user actions that indicate that the passenger likely desires to exit the vehicle. The computing system of the autonomous vehicle can detect such user actions and cause the autonomous vehicle to react such that the passenger can safely exit the vehicle. For instance, the vehicle computing system can detect that the passenger has actuated (e.g., pulled, otherwise manipulated) a handle of a vehicle door. A first actuation of the handle can cause the vehicle door to unlock. In response, the vehicle computing system can provide control signals to help prepare the autonomous vehicle to perform a potential stopping action by, for example, decelerating the vehicle. The vehicle computing system can then detect that the passenger has again actuated the door handle to cause the vehicle door to open. The vehicle computing system can provide control signals to cause the vehicle to stop (e.g., on the shoulder of the road) such that the passenger can safely exit the vehicle, if desired. In this way, the vehicle computing system can appropriately respond to user-actions indicative of the passenger's potential desire to exit the vehicle by controlling the autonomous vehicle to stop safely.

More particularly, an autonomous vehicle (e.g., a ground-based vehicle, air-based vehicle, other vehicle type) can include a vehicle computing system that implements a variety of systems on-board the autonomous vehicle. For instance, the vehicle computing system can include one or more data acquisition systems (e.g., image capture devices, LIDAR system, RADAR system), an autonomy computing system (e.g., for determining autonomous navigation), one or more vehicle control systems (e.g., for controlling braking, steering, powertrain), one or more vehicle component sensors (e.g., associated with a various vehicle components), a human-machine interface, etc. One or more of these systems can communicate to allow the autonomous vehicle to operate in a fully autonomous (e.g., self-driving) manner in which the autonomous vehicle can drive and navigate with minimal and/or no interaction from the human driver present in the vehicle. For example, the autonomous vehicle can operate in an autonomous navigation mode to transport one or more passengers to a destination location (e.g., while providing rideshare services). Moreover, one or more of these vehicle systems can communicate to safely stop for a passenger that desires to exit the vehicle while in the autonomous mode.

The vehicle computing system can detect a status change associated with one or more components of the autonomous vehicle that may indicate a passenger's desire to exit the vehicle. For instance, the vehicle computing system can detect a first status change of a vehicle door associated with a first user action of one or more passengers within the vehicle. By way of example, a passenger can actuate an interface (e.g., handle, button) associated with the vehicle door. The first actuation can cause the vehicle door to change from a locked state to an unlocked state. A sensor associated with the door can be configured to identify the first status change (e.g., from the locked to unlocked state) and send a sensor signal indicative of the first status change.

The vehicle computing system can receive the sensor signal and react accordingly. In some implementations, the vehicle computing system can determine one or more vehicle actions (e.g., intermediate vehicle actions) based at least in part on the first status change. By way of example, the vehicle computing system can send one or more control signals to cause the vehicle to cease further acceleration of the autonomous vehicle or to begin deceleration. In some implementations, the vehicle computing system can send one or more control signals to cause the vehicle to steer out of a current driving lane of the vehicle. Moreover, the vehicle computing system can cause the vehicle to enter into a ready state in which the vehicle computing system monitors for the occurrence of a second status change within a particular time window (e.g., 3 s, 5 s, 10 s . . . ). In some implementations, in the event that no additional status change occurs within the time window, the vehicle computing system can send control signal(s) to re-lock the vehicle door.

In the event of a second status change, the vehicle can react appropriately. For instance, the vehicle computing system can detect a second status change of the vehicle door associated with a second user action by the passenger(s) (e.g., within the time window). By way of example, a passenger can again actuate the interface (e.g., handle, button) associated with the vehicle door. The second actuation can cause the vehicle door to change from a closed state to an open state. A sensor associated with the door can identify the second status change (e.g., from the closed to open state) and send a sensor signal indicative of the second status change. The vehicle computing system can receive the sensor signal indicative of the second status change from the sensor associated with the vehicle door (e.g., within the time window).

The vehicle computing system can determine one or more vehicle actions for the vehicle to implement based at least in part on the second status change associated with the vehicle door. For example, the vehicle computing system can determine to stop the motion of the autonomous vehicle. The vehicle computing system can also, or alternatively, determine that the autonomous vehicle should contact a remote computing system associated with an operations control center (e.g., of a vehicle fleet manager).

By way of example, the autonomous vehicle can be travelling along a travel way (e.g., road) in a current travel lane. Upon detection of the first and/or second status change of the vehicle door (e.g., from the closed state to the open state), the vehicle computing system can determine that the vehicle is to decelerate, steer out of the current travel lane, and reach a stopped position on the shoulder section of the travel way. Moreover, the vehicle computing system can determine that the autonomous vehicle is to send a communication to a remote computing device (e.g., of an operations control center), such that a human operator can contact the passenger (e.g., via the vehicle's human machine interface systems, the passenger's user device) to help the passenger. The vehicle computing system can send one or more control signals to one or more systems on-board the vehicle (e.g., a motion planning system, vehicle control system, communication system) to perform the vehicle actions.

In some implementations, the vehicle computing system can cause the vehicle to resume travel using autonomous navigation. For instance, in the event that the vehicle door is returned to a closed state without the passenger exiting the vehicle, the vehicle computing system can send one or more control signals to lock the vehicle door and to continue travel (e.g., in the autonomous mode). Additionally, or alternatively, in the event that a passenger does not exit the vehicle within a particular time window (e.g., that begins when the second status change is detected), the vehicle computing system can prompt the passenger to close the vehicle door and resume autonomous navigation. Moreover, in the event that the passenger exits the autonomous vehicle (and/or any passenger problems are resolved), the autonomous vehicle can resume operation in the autonomous mode (e.g., for ridesharing services). In some implementations, the autonomous vehicle may receive a communication from a remote computing device (e.g., operations control center) instructing the vehicle to resume travel in the autonomous mode. In this way, the autonomous vehicle can be reset after it has stopped to allow a passenger to safely exit the vehicle.

In some implementations, the vehicle computing system can detect other types of data that are indicative of the passenger's potential desire to exit the vehicle. For instance, the vehicle computing system can detect passenger data associated with at least one of the passenger(s) of the vehicle. The passenger data can indicative of a status change associated with the passenger relative to the vehicle (e.g., interior of the vehicle). By way of example, the vehicle computing system can receive a signal from a seat belt sensor indicating a disengagement of the passenger's seat belt. Additionally, or alternatively, the vehicle computing system can receive a signal from a seat sensor indicating a decrease in the weight load of the passenger's seat. The vehicle computing system can determine one or more preliminary actions based at least in part on the passenger data (e.g., to prepare the vehicle). For example, the vehicle computing system can enter into the ready state to monitor for a status change associated with a vehicle component (e.g., a vehicle door).

The system and methods described herein may provide a number of technical effects and benefits. For instance, the vehicle computing system can locally (e.g., on-board the vehicle) monitor for component status changes (e.g., of a vehicle door) that may indicate a passenger's desire to exit the vehicle. Moreover, the autonomous vehicle can react accordingly to provide safer circumstances for the passenger to exit the vehicle, without having to communicate with a remote operations computing system of the service provider. This can allow the autonomous vehicle to avoid potential latency issues that can arise when communicating with remote computing devices (e.g., due to poor network connectively, data upload/download). The autonomous vehicle can also avoid potential latency issues that can arise from remote computing device(s) processing multiple vehicle diagnosis requests (e.g., in the order they are received).

Furthermore, by addressing the passenger's desire to exit the autonomous vehicle via on-board analysis, the systems and methods of the present disclosure can limit the allocation of processing and storage resources of the operations computing system that are required for such analysis. The saved resources can be allocated to other functions of the operations computing systems, such as the processing of service requests, vehicle routing, etc. In this way, the systems and methods according to example aspects of the present disclosure have a technical effect of providing a computationally efficient approach to addressing the desire of passengers to exit the autonomous vehicle while saving computational resources for other functions.

The systems and methods of the present disclosure also provide an improvement to vehicle computing technology, such as autonomous vehicle computing technology. For instance, the methods and systems enable the vehicle technology to locally detect and address a passenger that acts to exit the vehicle. For example, the systems and methods can allow one or more on-board computing device(s) to detect a first status change of a vehicle door. The first status change can be associated with a first user action associated with the vehicle door (e.g., a pull of the door handle). Moreover, the computing device(s) can detect a second status change of the vehicle door. The second status change can be associated with a second user action associated with the vehicle door. Both the first user action and the second user action are performed by one or more passengers of the autonomous vehicle. The computing device(s) can determine one or more vehicle actions based at least in part on at least one of the first status change and the second status change associated with the vehicle door (e.g., a stopping action). The computing device(s) can provide one or more control signals to one or more systems on-board the autonomous vehicle to implement the vehicle actions (e.g., to safely stop the vehicle). As such, the systems and methods of the present disclosure can improve the vehicle computing system's ability to safely stop for a passenger that desires to exit the vehicle that is traveling in an autonomous mode. For example, the systems and methods can improve the vehicle computing system by reducing the computational response time for safely stopping (e.g., by avoiding the aforementioned latency issues of remote computing devices). This can increase the safety of the passenger(s) of the vehicle. Moreover, by reducing the vehicle computing system's reliance on remote computing devices, the systems and methods of the present disclosure can reduce stress on the vehicle's communication interfaces, bandwidth usage, network traffic, etc.

With reference now to the FIGS., example embodiments of the present disclosure will be discussed in further detail. FIG. 1 depicts an example system 100 according to example embodiments of the present disclosure. The system 100 can include a vehicle computing system 101 associated with a vehicle 102 and an operations computing system 104 that is remote from the vehicle 102.

The vehicle 102 incorporating the vehicle computing system 101 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can operate semi-autonomously with some interaction from a human driver present in the vehicle 102. The vehicle 102 can be configured to operate in a fully autonomous manner (e.g., self-driving manner) such that the vehicle 102 can drive, navigate, operate, etc. with no interaction from a human driver.

As shown in FIG. 1, the vehicle 102 can include one or more data acquisition systems 106, an autonomy computing system 108, and one or more vehicle control systems 110. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisition system(s) 106 can be configured to obtain acquire sensor data associated with one or more objects that are proximate to the vehicle 102 (e.g., within a field of view of one or more of the data acquisition system(s)

106). The data acquisition system(s) 106 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data can include image data, radar data, LIDAR data, and/or other data acquired by the data acquisition system(s) 106. The object(s) can include, for example, pedestrians, vehicles, bicycles, and/or other objects. The object(s) can be located in front of, to the rear of, and/or to the side of the vehicle 102. The sensor data can be indicative of locations associated with the object(s) within the surrounding environment of the vehicle 102 at one or more times. The data acquisition system(s) 106 can provide the sensor data to the autonomy computing system 108.

In addition to the sensor data, the autonomy computing system 108 can retrieve or otherwise obtain map data 112 associated with the surroundings of the vehicle 102. The map data 112 can provide detailed information about the surrounding environment of the vehicle 102. For example, the map data 112 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomy computing system 108 can include a perception system 114, a prediction system 116, and a motion planning system 118 that cooperate to perceive the surrounding environment of the vehicle 102 and determine a motion plan for controlling the motion of the vehicle 102 accordingly. For example, the autonomy computing system 108 can receive the sensor data from the data acquisition system(s) 106, attempt to comprehend the surrounding environment by performing various processing techniques on data collected by the data acquisition system(s) 106, and generate an appropriate motion plan through such surrounding environment. The autonomy computing system 108 can control the one or more vehicle control systems 110 to operate the vehicle 102 according to the motion plan.

The autonomy computing system 108 can identify one or more objects that are proximate to the vehicle 102 based at least in part on the sensor data and/or the map data 112. For example, the perception system 114 can obtain state data descriptive of a current state of an object that is proximate to the vehicle 102. The state data for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. The perception system 114 can provide the state data to the prediction system 116 (e.g., for predicting the movement of an object).

The prediction system 116 can create predicted data associated with each of the respective one or more objects proximate to the vehicle 102. The predicted data can be indicative of one or more predicted future locations of each respective object. The predicted data can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the speed at which the object is predicted to travel along the predicted path). The prediction system 116 can provide the predicted data associated with the object(s) to the motion planning system 118.

The motion planning system 118 can determine a motion plan for the vehicle 102 based at least in part on the predicted data. The motion plan can include vehicle actions with respect the objects proximate to the vehicle 102 as well as the predicted movements. For instance, the motion planning system 118 can implement an optimization algorithm that considers cost data associated with a vehicle action as well as other cost functions (e.g., based on speed limits, traffic lights, etc.), if any, to determine optimized variables that make up the motion plan. By way of example, the motion planning system 118 can determine that the vehicle 102 can perform a certain action (e.g., pass an object) without increasing the potential risk to the vehicle 102 and/or violating any traffic laws (e.g., speed limits, lane boundaries, signage). The motion plan can include a planned trajectory, speed, acceleration, etc. of the vehicle 102.

The motion planning system 118 can provide the motion plan indicative of the vehicle actions, a planned trajectory, and/or other operating parameters to the vehicle control system(s) 110 to implement the motion plan for the vehicle 102. For instance, the vehicle 102 can include a mobility controller configured to translate the motion plan into instructions. By way of example, the mobility controller can translate a determined motion plan into instructions to adjust the steering of the vehicle 102 "X" degrees, apply a certain magnitude of braking force, etc. The mobility controller can send one or more control signals to the vehicle control components (e.g., braking control component, steering control component) to execute the instructions and implement the motion plan.

The vehicle 102 can include one or more vehicle component sensors 120 associated with various vehicle components. The vehicle component sensor(s) 120 can include load/weight sensors, audio sensors, temperature sensors, vibration sensors, motion sensors, and/or other types of sensors that are configured to detect a change in status associated with a vehicle component. By way of example, the vehicle 102 can include a vehicle component sensor 120 associated with a vehicle door that is configured to monitor and/or detect the status of the vehicle door (e.g., whether it is locked, unlocked, closed, open). The vehicle 102 can include a vehicle component sensor 120 associated with a seat of a passenger. The vehicle component sensor 120 associated with the seat of a passenger can be configured to monitor and/or detect the status of the seat (e.g., whether a weight load is present in the seat, whether a weight load has been removed from the seat, temperature of a seat). The vehicle 102 can include a vehicle component sensor 120 associated with a seatbelt of a passenger. The vehicle component sensor 120 associated with a seatbelt of a passenger can be configured to monitor and/or detect the status of the seatbelt (e.g., whether the seat belt is secured, unsecured).

The vehicle 102 can include a communications system 122 configured to allow the vehicle computing system 101 (and its computing device(s)) to communicate with other computing devices. The vehicle computing system 101 can use the communications system 122 to communicate with the operations computing system 104 and/or one or more other remote computing device(s) over the network(s) (e.g., via one or more wireless signal connections). In some implementations, the communications system 122 can allow communication among one or more of the system(s) on-board the vehicle 102. The communications system 122 can include any suitable components for interfacing with one or more network(s), including for example, transmitters, receivers, ports, controllers, antennas, or other suitable components that can help facilitate communication with one or more remote computing device(s) that are remote from the vehicle 102.

The vehicle 102 can provide one or more vehicle services to one or more passengers 124. The vehicle service(s) can include transportation services (e.g., rideshare services), courier services, delivery services, and/or other types of services. For instance, the vehicle 102 can operate in an autonomous navigation mode to transport the one or more passengers 124 to a destination location (e.g., while providing rideshare services). In some implementations, the vehicle 102 can be associated with an entity (e.g., a service provider, owner, manager). In some implementations, the entity (e.g., a service provider) can be one that provides one or more vehicle service(s) to a plurality of users via a fleet of vehicles that includes, for example, the vehicle 102. In some implementations, the entity can be associated with only vehicle 102 (e.g., a sole owner, manager). The operations computing system 104 can be associated with the entity.

The vehicle 102 can include one or more computing devices 126 to help control the vehicle 102 based on a passenger-initiated action. The computing device(s) 126 can be included with and/or separate from the autonomy computing system 108 and/or its sub-systems (e.g., perception system 114, prediction system 116, motion planning system 118). The computing device(s) 126 can be configured to communicate with one or more of the other components of the vehicle 102 (e.g., of the vehicle computing system 101). The computing device(s) 126 can include various components for performing various operations and functions. For instance, the computing device(s) 126 can include one or more processor(s) and one or more tangible, non-transitory, computer readable media, each of which are on-board the vehicle 102. The one or more one or more tangible, non-transitory, computer readable media can store instructions that when executed by the one or more processor(s) cause the one or more processor(s) (the vehicle computing system 101) to perform operations and functions, such as those for controlling an autonomous vehicle based on a passenger-initiated action, as described herein.

Figure 2:
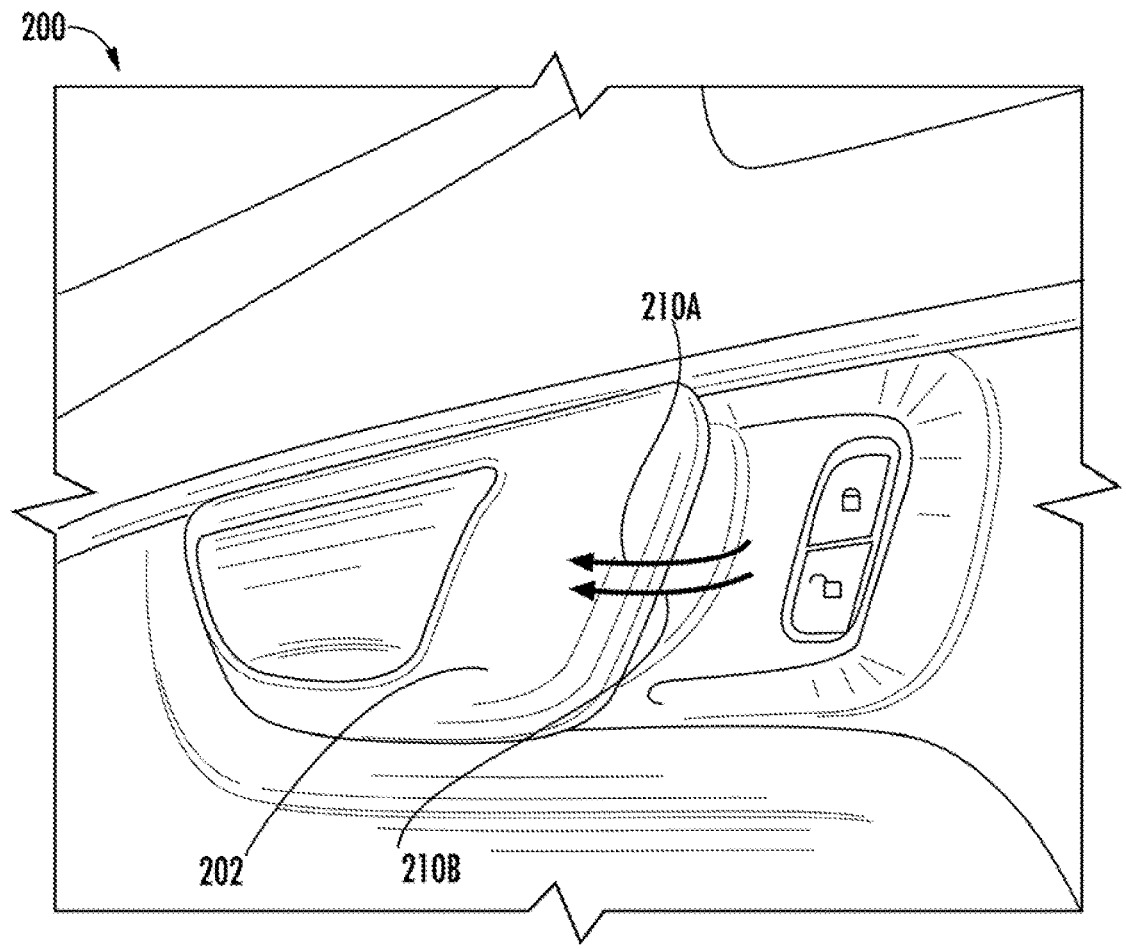
FIG. 2 depicts an example vehicle component according to example embodiments of the present disclosure

The computing device(s) 126 can detect a status change associated with one or more components of the vehicle 102 that may indicate a passenger's desire to exit the vehicle 102. For instance, as shown in FIG. 2, the vehicle 102 can include a component 200 (e.g., a vehicle door) that includes an interface 202. While FIG. 2 depicts a vehicle door, embodiments of the present disclosure can include other vehicle components (e.g., window, sunroof, hatch, etc.). The interface 202 can include a handle, button, lever, switch, knob, touchscreen, voice activated interface, motion activated interface (e.g., without physically touching the interface), and/or other types of interfaces. The component 200 (e.g., a vehicle door) can be configured such that a first actuation of the interface (e.g., by pulling, pushing, turning, interacting with, otherwise manipulating the interface) causes the component 200 (e.g., vehicle door) to unlock.

Moreover, the component 200 (e.g., vehicle door) can be configured such that a second actuation of the interface 202 causes the component 200 (e.g., vehicle door) to open. The computing device(s) 126 can detect a first status change 206 associated with the component 200 (e.g., vehicle door). The first status change 206 can be associated with a first user action 210A performed by one or more passengers 124 of the vehicle 102. By way of example, a passenger 124 can cause a first actuation of the interface 202 (e.g., by pulling a handle) associated with the component 200 (e.g., vehicle door). The first actuation can cause the first status change 206, which can include the component 200 (e.g., vehicle door) changing from a locked state (e.g., "$STATE_{1A}$") to an unlocked state (e.g., "$STATE_{1B}$").

A sensor 120 associated with the component 200 (e.g., vehicle door) can be configured to identify the first status change 206 (e.g., from the locked to unlocked state). As shown in FIG. 1, the sensor 120 can send a first sensor signal 128 indicative of the first status change 206. A sensor signal can be in a binary format (e.g., indicating the occurrence of a status change), provide data indicative of the specific status change (e.g., indicating the specific type of change from the locked to unlocked state), and/or other formats. The computing device(s) 126 can receive the first sensor signal 128 (e.g., directly from the sensor 120 associated with the component 200 and/or from an intermediary device).

The computing device(s) 126 can receive the first sensor signal 128 and can react accordingly. The computing device(s) 126 can determine one or more vehicle actions (e.g., intermediate vehicle actions) based at least in part on the first status change 206. For instance, the computing device(s) 126 can send one or more first control signals 130 to cause the vehicle 102 to take one or more vehicle actions. The computing device(s) 126 can send the first control signals 130 to the motion planning system 118 so that the vehicle 102 can generate a motion plan based at least in part on vehicle action(s). Additionally, or alternatively, the computing device(s) 126 can send the first control signals 130 to the vehicle control system(s) 110. This can allow, for example, the computing device(s) 126 to bypass the motion planning system 118 and directly instruct the vehicle control system(s) 110 to implement the determined vehicle actions.

The vehicle action(s) can include various operations for increasing passenger safety in the event of a passenger exiting the vehicle 102. By way of example, the computing device(s) 126 can send the one or more first control signals 130 to cease further acceleration of the vehicle 102 and/or to begin deceleration (e.g., by ceasing further actuation of an accelerator component, by applying force via a braking component). In some implementations, the computing device(s) 126 can send one or more first control signals 130 to cause the vehicle 102 to steer out of a current driving lane of the vehicle 102. Moreover, the computing device(s) 126 can send one or more first control signals 130 (e.g., to the motion planning system 118, vehicle control system(s) 110, other components) to cause the vehicle 102 to enter into a ready state in which the vehicle computing system 101 monitors for the occurrence of a second status change within a particular time window, as further described herein.

Returning to FIG. 2, the computing device(s) 126 can detect a second status change 208 associated with the component 200 (e.g., vehicle door). The second status change 208 can be associated with a second user action 210B performed by one or more passengers 124 of the vehicle 102. This can be the same passenger that performed the first user action 210A or a different passenger. The second user action 210B (e.g., a second actuation of the interface 202) is subsequent in time to the first user action 210A (e.g., the first actuation of the interface 202). The second status change 208 can be associated with the component 200 (e.g., vehicle door) changing from a closed state (e.g., "STATE$_{2A}$") to an open state (e.g., "STATE$_{2B}$"). By way of example, a passenger 124 can cause a second actuation of the interface 202 (e.g., by pulling the handle) associated with the component 200 (e.g., vehicle door). The second actuation can cause the component 200 (e.g., vehicle door) to change from a closed state to an open state. A vehicle component sensor 120 associated with the component 200 (e.g., vehicle door) can identify the second status change 208 (e.g., from the closed to open state). The vehicle component sensor 120 associated with the component 200 (e.g., vehicle door) can send a second sensor signal 132 indicative of the second status change 208. The computing device(s) 126 can receive the second sensor signal 132 indicative of the second status change 208 (e.g., directly from the sensor 120 associated with the component 200 (e.g., vehicle door), from an intermediary device).

In some implementations, the computing device(s) 126 can be configured to detect the second status change 208 based at least in part on a time window 212. For instance, the computing device(s) 126 can detect the second status change 208 associated with the component 200 (e.g., vehicle door) within a time window 212 that begins upon the detection of the first status change 206. To do so, the computing device(s) 126 can receive the second sensor signal 132 (e.g., indicative of the second status change 208) from the sensor 120 associated with the component 200 (e.g., vehicle door) within the time window 212. In the event that a second status change 208 is not detected (e.g., within the time window 212), the computing device(s) 126 can send one or more control signals (e.g., to a control device associated with the component 200) to re-lock the component 200 (e.g., to change the vehicle door from the unlocked state to the locked state).

In the event of a second status change 208, the vehicle 102 can react appropriately. For instance, the computing device(s) 126 can determine one or more vehicle actions for the vehicle 102 based at least in part on the second status change 208 associated with the component 200 (e.g., vehicle door). For example, the computing device(s) 126 can determine to stop the motion of the vehicle 102. The computing device(s) 126 can also, or alternatively, determine that the vehicle 102 should contact the operations computing system 104 such that additional help can be provided to the passenger 124, if needed. The computing device(s) 126 can provide one or more second control signals 134 to implement the vehicle actions. For example, the computing device(s) 126 can provide one or more second control signals 134 to the motion planning system 118 and/or the vehicle control system(s) 110 to facilitate stopping the motion of the vehicle 102. The computing device(s) 126 can provide one or more second control signals 134 to the communications system 122 to facilitate communication with a remote computing device.

Figure 3:
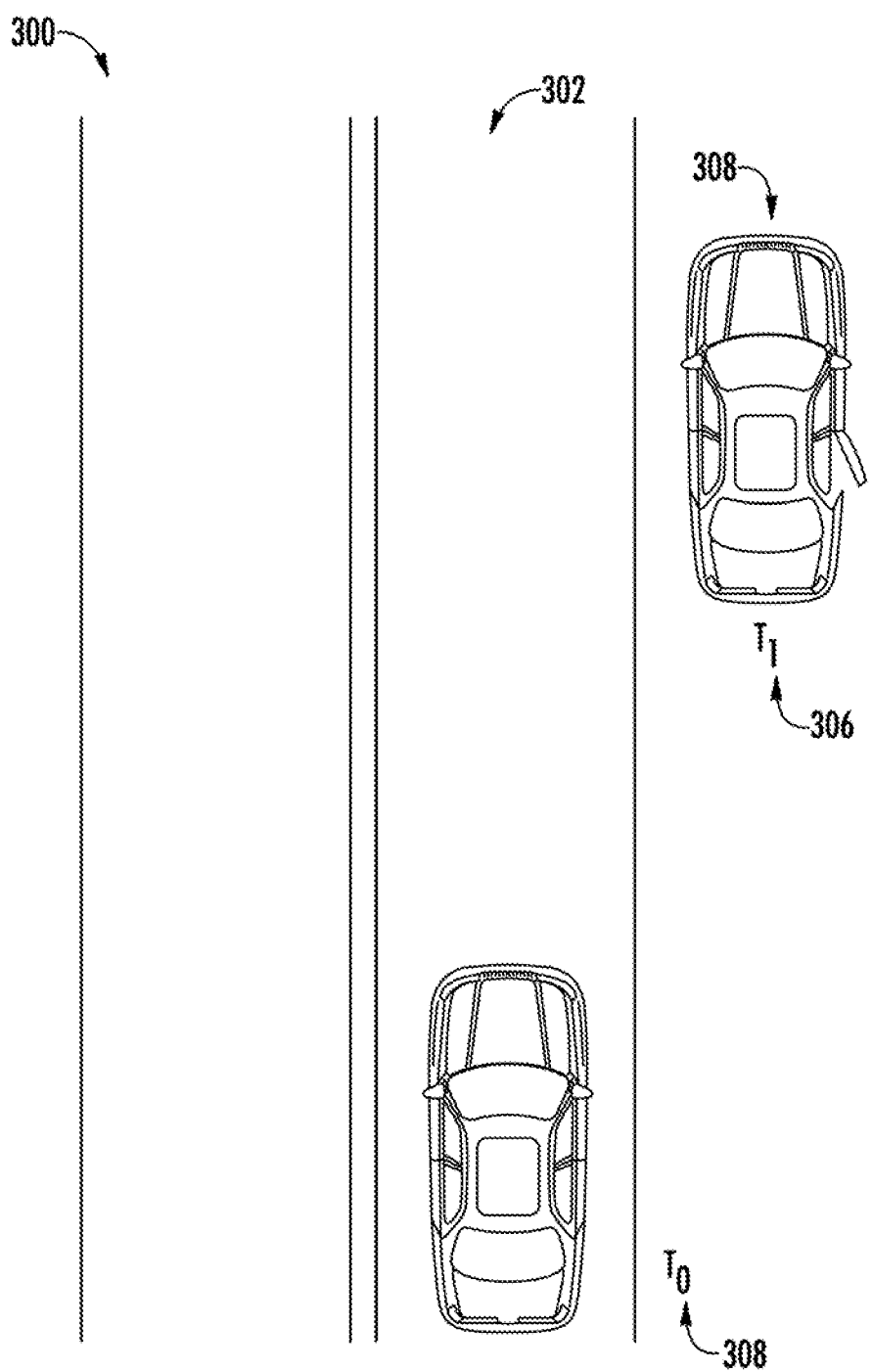
FIG. 3 depicts an example travel way according to example embodiments of the present disclosure.

An example implementation of the present disclosure can be described with reference to FIG. 3, which depicts an example travel way 300 according to example embodiments of the present disclosure. By way of example, the vehicle 102 can be travelling in an autonomous mode along the travel way 300 (e.g., road) in a current travel lane. A passenger 124 can perform a first user action 210A associated with the component 200 (e.g., vehicle door), such as a first actuation of an interface 202. The first user action 210A can cause a first status change 206, such as the component 200 (e.g., vehicle door) changing from the locked state to the unlocked state. The computing device(s) 126 can detect the first status change 206 (e.g., associated with a first actuation of an interface 202) at a first time 304 ("$T_0$"). As described herein, the computing device(s) 126 can detect the first status change 206 via a first sensor signal 128 provided from a sensor 120 associated with the component 200 (e.g., vehicle door). The computing device(s) 126 can determine one or more vehicle actions (e.g., intermediate vehicle actions) based at least in part on the first status change 206. For instance, the computing device(s) 126 can determine that the vehicle 102 is to decelerate such that the vehicle 102 can reach a stopped position in the event that the passenger 124 causes the component 200 (e.g., vehicle door) to open and exits the vehicle 102. The computing device(s) 126 can also determine that the vehicle 102 is to navigate out of the current travel lane 302 (e.g., to a shoulder section of the travel way 300). This can allow the vehicle 102 to travel towards a safer stopping position in the event the passenger desires to exit the vehicle 102.

Additionally, or alternatively, detection of the first status change 206 can begin a time window 212. In the event that the computing device(s) 126 do not detect a second status change 208 within the time window 212, the computing device(s) 126 can re-lock the component 200 (e.g., vehicle door) and can resume navigation in the autonomous mode (e.g., accelerating to a previous speed, pulling into the travel lane). A next detected status change can thereafter be treated by the computing device(s) 126 as a first status change.

The computing device(s) 126 can detect a second status change 208 of the component 200 (e.g., vehicle door) at a second time 306 ("$T_1$") (e.g., within the time window 212). For instance, a passenger 124 can perform a second user action 210B associated with the component 200 (e.g., vehicle door), such as a second actuation of the interface 202 associated with the component 200 (e.g., vehicle door) (e.g., pulling of the door handle). The second status change 208 can be associated with the second actuation of the interface 202 associated with the component 200 (e.g., vehicle door). The computing device(s) 126 can detect the second status change 208 within the time window 212 (e.g., $T_1$ is within the time window 212). The computing device(s) 126 can determine one or more vehicle actions based at least in part on the second status change 208. For example, if the vehicle 102 has not already done so, the computing device(s) 126 can determine one or more vehicle actions that include decelerating the vehicle 102 to a stopped position 308 that is located out of a current travel lane 302 of the vehicle 102.

Additionally, or alternatively, computing device(s) 126 can contact a remote computing device to help provide assistance to the passenger 124. By way of example, as shown in FIG. 1, one or more of the vehicle actions can include sending a communication 136 to a remote computing device associated with the operation of the vehicle 102 (e.g., the operations computing system 104). The communication 136 can request that a human operator contact the one or more passengers 124 (e.g., via a human-machine interface of the vehicle 102, via a user device associated with the passenger 124). The human operator can communicate with the passenger 124 to determine if the passenger 124 needs additional assistance.

In some implementations, the computing device(s) 126 can cause the vehicle 102 to resume travel using autonomous navigation. For instance, in the event that the component 200 (e.g., vehicle door) is returned to a closed state without a passenger 124 exiting the vehicle 102, the computing device(s) 126 can send one or more control signals to lock the component 200 (e.g., vehicle door) and to continue travel (e.g., in the autonomous mode). Additionally, or alternatively, in the event that a passenger 124 does not exit the vehicle 102 within a particular time window (e.g., that begins when the second status change 208 is detected), the vehicle computing device(s) 126 can prompt the passenger 124 (e.g., via a human-machine interface of the vehicle 102, via a message to a user device associated with the passenger 124) to close the component 200 (e.g., vehicle door) and resume autonomous navigation. In some implementations, the operations computing system 104 can prompt the passenger 124 (e.g., via a remote human operator, via a human-machine interface of the vehicle 102, via a message to a user device associated with the passenger 124) to close the component 200 (e.g., vehicle door). Moreover, in the event that the passenger 124 exits the vehicle 102 (and/or any passenger problems are resolved), the vehicle 102 can resume operation in the autonomous mode (e.g., for ride-sharing services). In some implementations, the vehicle 102 can receive a communication 138 from a remote computing device (e.g., operations control center) instructing the vehicle 102 to resume travel in the autonomous mode. In this way, the vehicle 102 can be reset after it has stopped to allow a passenger 124 to safely exit the vehicle 102.

In some implementations, the computing device(s) 126 can detect other types of data that are indicative of the passenger's potential desire to exit the vehicle 102. For instance, the computing device(s) 126 can detect passenger data 140 associated with at least one of the passenger(s) 124 of the vehicle 102. The passenger data 140 can indicative of a status change associated with the passenger 124 relative to the vehicle 102 (e.g., interior of the vehicle). By way of example, the computing device(s) 126 can receive a sensor signal from a vehicle component sensor 120 associated with a seatbelt indicating a disengagement of the passenger's seat belt. Additionally, or alternatively, the computing device(s) 126 can receive a sensor signal from a vehicle component sensor 120 associated with a passenger seat indicating a decrease in the weight load of the passenger's seat and/or a change in temperature associated with the passenger's seat. The computing device(s) 126 can determine one or more preliminary actions based at least in part on the passenger data 140 (e.g., to prepare the vehicle 102). For example, the computing device(s) 126 can cause the vehicle computing system 101 to enter into the ready state to monitor for a status change associated with a vehicle component (e.g., a vehicle door).

Figure 4:
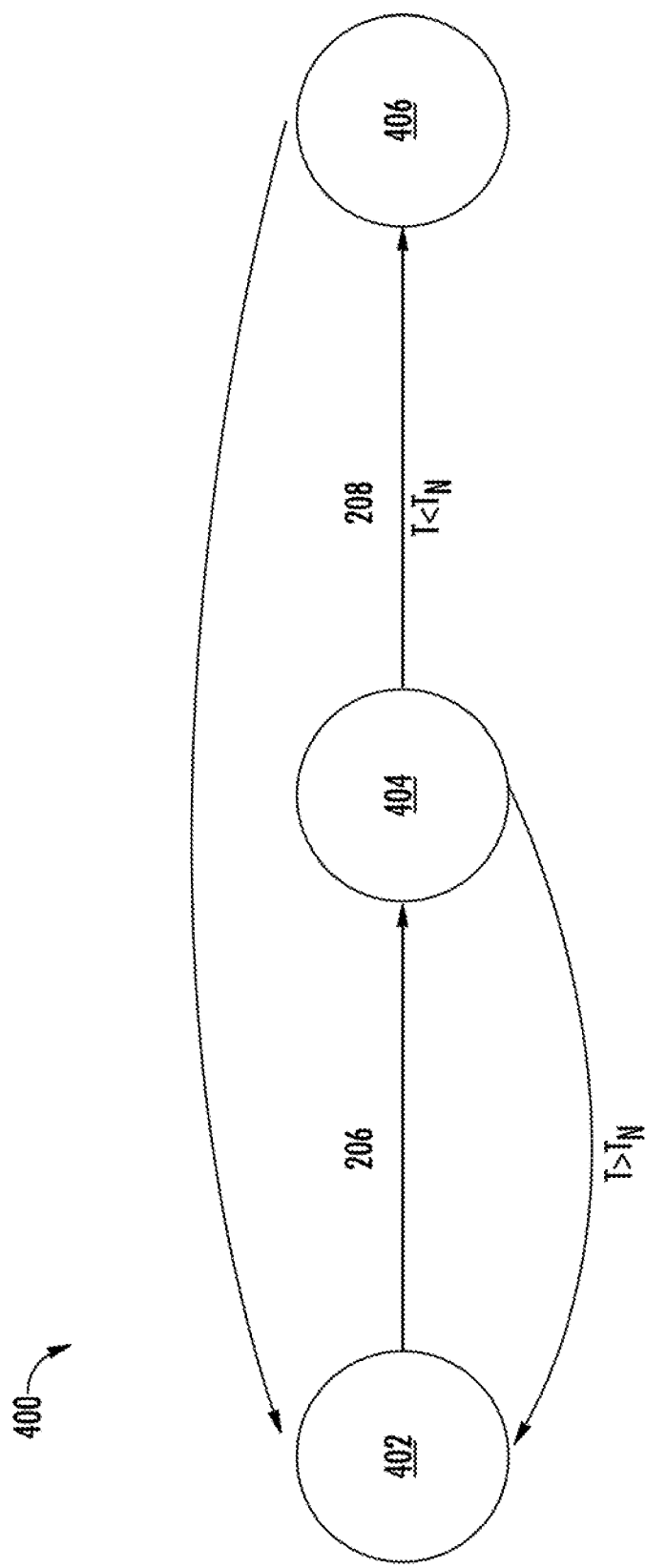
FIG. 4 depicts an example diagram of various states of an autonomous vehicle according to example embodiments of the present disclosure.

FIG. 4 depicts an example diagram 400 of various states of the vehicle 102 according to example embodiments of the present disclosure. The vehicle 102 can be in an initial state 402 in which the vehicle 102 (e.g., the computing device(s) 126) can detect a first status change 206 associated with the component 200 (e.g., a vehicle door). Upon detection of the first status change 206, the vehicle 102 can enter into a ready state 404. While in the ready state, the vehicle 102 (e.g., the computing devices 126) can monitor for the occurrence of a second status change 208 within a particular time window 212. Additionally, or alternatively, while in the ready state the vehicle 102 can perform one or more vehicle actions (e.g., deceleration, steering out of current lane) based at least in part the first status change 206.

In some implementations, in the event that no additional status change occurs within the time window 212, the computing devices 126 can send one or more control signals to readjust the status of the component 200 (e.g., to change the vehicle door from the unlocked state to the locked state). The vehicle 102 can return to the initial state 402 from the ready state 404. As such, the next detected status change can be treated as a first status change.

In the event that the vehicle 102 detects a second status change 208 while in the ready state 404, the vehicle 102 can enter into stopping state 406. For instance, the vehicle 102 can detect a second status change 208 and determine one or more vehicle actions based at least in part on the second status change 208. In the event that the vehicle 102 has not already done so, the vehicle 102 can implement one or more vehicle actions to cause the vehicle 102 to reach a stopped position. In this way, the vehicle 102 can enter the stopping state 406 such that a passenger 124 can safely exit the vehicle 102 while the vehicle 102 is operating in autonomous mode. As described herein, the vehicle 102 can be reset such that the vehicle 102 can resume autonomous navigation and return to the initial state 402 from the stopping state 406.

Figure 5:
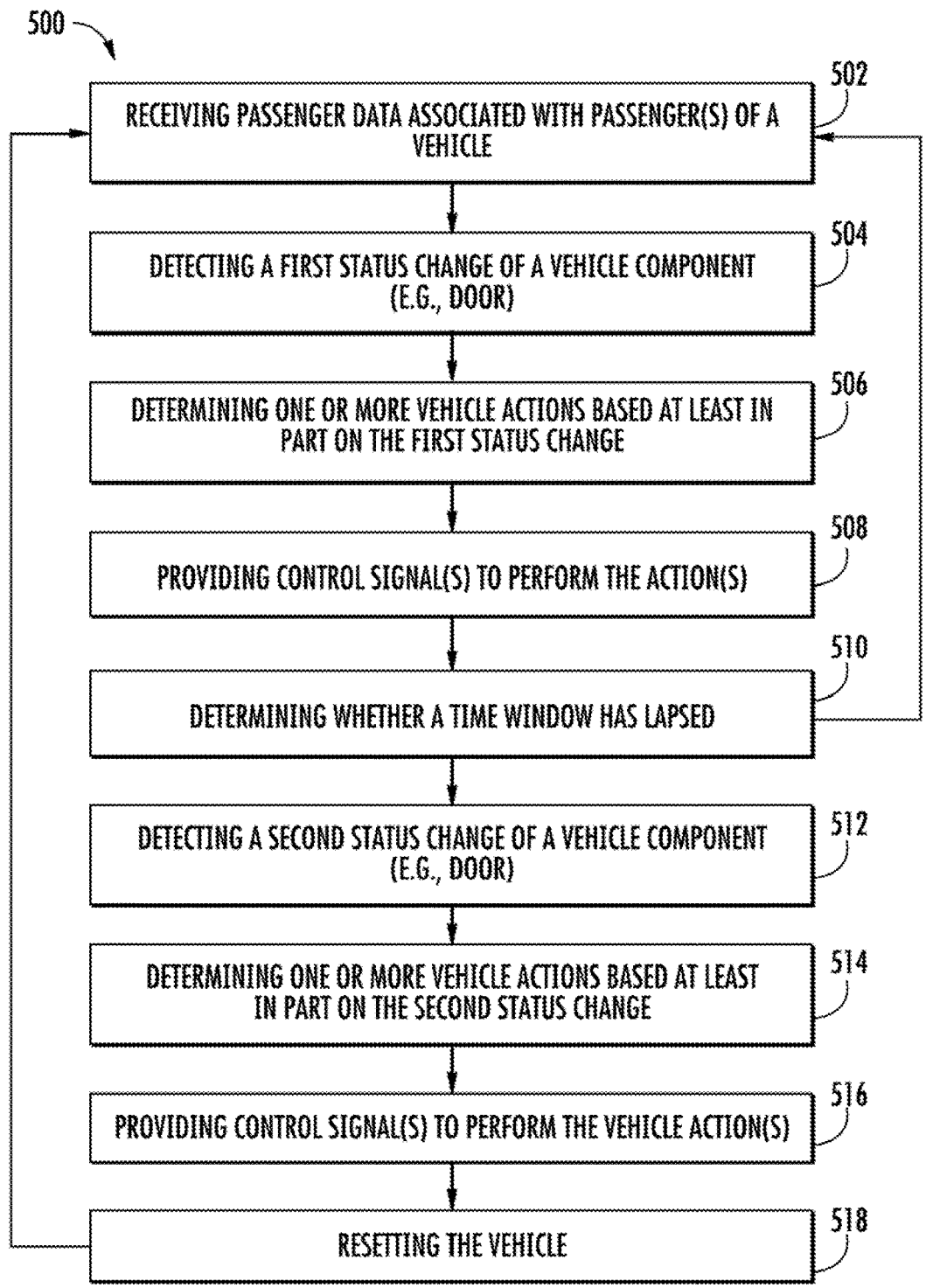
FIG. 5 depicts a flow diagram of an example method of controlling an autonomous vehicle based on a passenger-initiated action according to example embodiments of the present disclosure.

FIG. 5 depicts a flow diagram of an example method 500 of controlling an autonomous vehicle based on a passenger-initiated action according to example embodiments of the present disclosure. One or more portion(s) of the method 500 can be implemented by one or more computing devices such as, for example, the computing device(s) 126 of FIG. 1. Moreover, one or more portion(s) of the method 500 can be implemented as an algorithm on the hardware components of the device(s) described herein (e.g., as in FIGS. 1 and 6) to, for example, control an autonomous vehicle based on a passenger-initiated action. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include receiving passenger data associated with passenger(s) of a vehicle. For instance, the computing device(s) 126 (onboard the vehicle 102) can receive passenger data 140 associated with at least one of the one or more passengers 124 of the vehicle 102. As described herein, the passenger data 140 can be indicative of a status change associated with at least one of a seat belt of the passenger 124 or a seat of the passenger 124. In some implementations, in the event of such a status change, the vehicle 102 can enter into the ready state 404 (e.g., to monitor for the occurrence of a subsequent status change) and/or perform one or more preliminary actions (e.g., request a human operator to contact the passenger 124).

At (504), the method 500 can include detecting a first status change of a vehicle component. For instance, the computing device(s) 126 can detect a first status change 206 of a vehicle component 200 (e.g., a vehicle door). The first status change 206 can be associated with a first user action 210A associated with vehicle component 200 (e.g., the vehicle door). The first user action 210A can include a first actuation of an interface 202 associated with the vehicle component 200 (e.g., a handle associated with the vehicle door). The first actuation can be performed by and/or associated with one or more passengers 124 of the vehicle 102. The first status change 206 can be associated with the vehicle component 200 (e.g., the vehicle door) changing from a locked state to an unlocked state, as described herein.

At (506), the method 500 can include determining one or more vehicle actions based at least in part on the first status change. For instance, the computing device(s) 126 can determine one or more vehicle actions based at least in part on the first status change 206. By way of example, the one or more vehicle actions can include one or more intermediate vehicle actions based at least in part on the first status change 206 associated with the vehicle component 200 (e.g., the vehicle door). The one or more intermediate vehicle actions can include, for example, decelerating the vehicle 102, stopping the vehicle 102, steering the vehicle 102 out of a current travel lane 302, etc. At (508), the computing device(s) 126 can provide one or more control signals 130 to one or more systems on-board the vehicle 102 (e.g., the motion planning system 118, vehicle control system(s) 110, communication system 122) to implement the vehicle actions based at least in part on the first status change 206.

At (510), the method 500 can include determining whether a time window has lapsed. For instance, a time window 212 (e.g., 5 s, 10 s, 20 s, 1 minute, etc.) can begin when the computing device(s) 126 detect the first status change 206. In the event that the time window 212 lapses, the vehicle 102 can return to the initial state 402 (e.g., to monitor for passenger data 140, a first status change 206). In some implementations, the computing device(s) 126 can send one or more control signals to change the status of the vehicle component 200 in the event that the time window 212 lapses without the detection of a second status change 208 (e.g., to change the vehicle door from an unlock state to a locked state).

At (512), the method 500 can include detecting a second status change of the vehicle component. For instance, the computing device(s) 126 can detect a second status change 208 of the vehicle component 200 (e.g., the vehicle door). The second status change 208 can be associated with a second user action 210B associated with the vehicle component 200 (e.g., the vehicle door). As described herein, the second user action can be performed by and/or associated with one or more passengers 124 of the vehicle 102. For example, the second user action 210B can include a second actuation of the interface 202 (e.g., the handle) that is subsequent in time to the first actuation. The second status change 208 can be associated with the vehicle component 200 (e.g., the vehicle door) changing from a closed state to an open state. The vehicle 102 can be traveling in an autonomous mode when the second status change 208 is detected.

At (514), the method 500 can include determining one or more vehicle actions based at least in part on the second status change. For instance, the computing device(s) 126 can determine one or more vehicle actions based at least in part on the second status change 208 associated with the vehicle component 200 (e.g., the vehicle door). As described herein, the one or more vehicle actions can include stopping a motion of the vehicle 102 and/or decelerating the vehicle 102 to a stopped position 308. In some implementations, the one or more vehicle actions can include steering the vehicle 102 out of a current travel lane 302. In some implementations, the one or more vehicle actions can include providing a communication 136 to a remote computing device associated with the operation of the vehicle 102 (e.g., the operations computing system 104). The communication 136 can request that a human operator contact the one or more passengers 124. At (516), the computing device(s) 126 can provide one or more control signals 134 to the one or more systems on-board the vehicle 102 to implement the vehicle actions.

In this way, the computing device(s) 126 can determine one or more vehicle actions based at least in part on at least one of the first status change 206 or the second status change 208 associated with the vehicle component 200 (e.g., the vehicle door) and can provide one or more control signals 130, 134 to one or more systems on-board the vehicle 102 (e.g., motion planning system 118, the vehicle control system(s) 110, the communication system 122) to implement the vehicle actions.

At (518), the method can include resetting the vehicle. For instance, the computing device(s) 126 can cause the vehicle 102 to return to an initial state 402. By way of example, the computing device(s) 126 can determine one or more passengers 124 have not exited the vehicle 102 within a time window 212 that begins upon the detection of the second status change 208 and that the vehicle door is closed. The computing device(s) 126 can provide one or more control signals to cause the vehicle 102 to resume traveling in the autonomous mode (and/or to lock the vehicle door) and return to the initial state 402.

Figure 6:
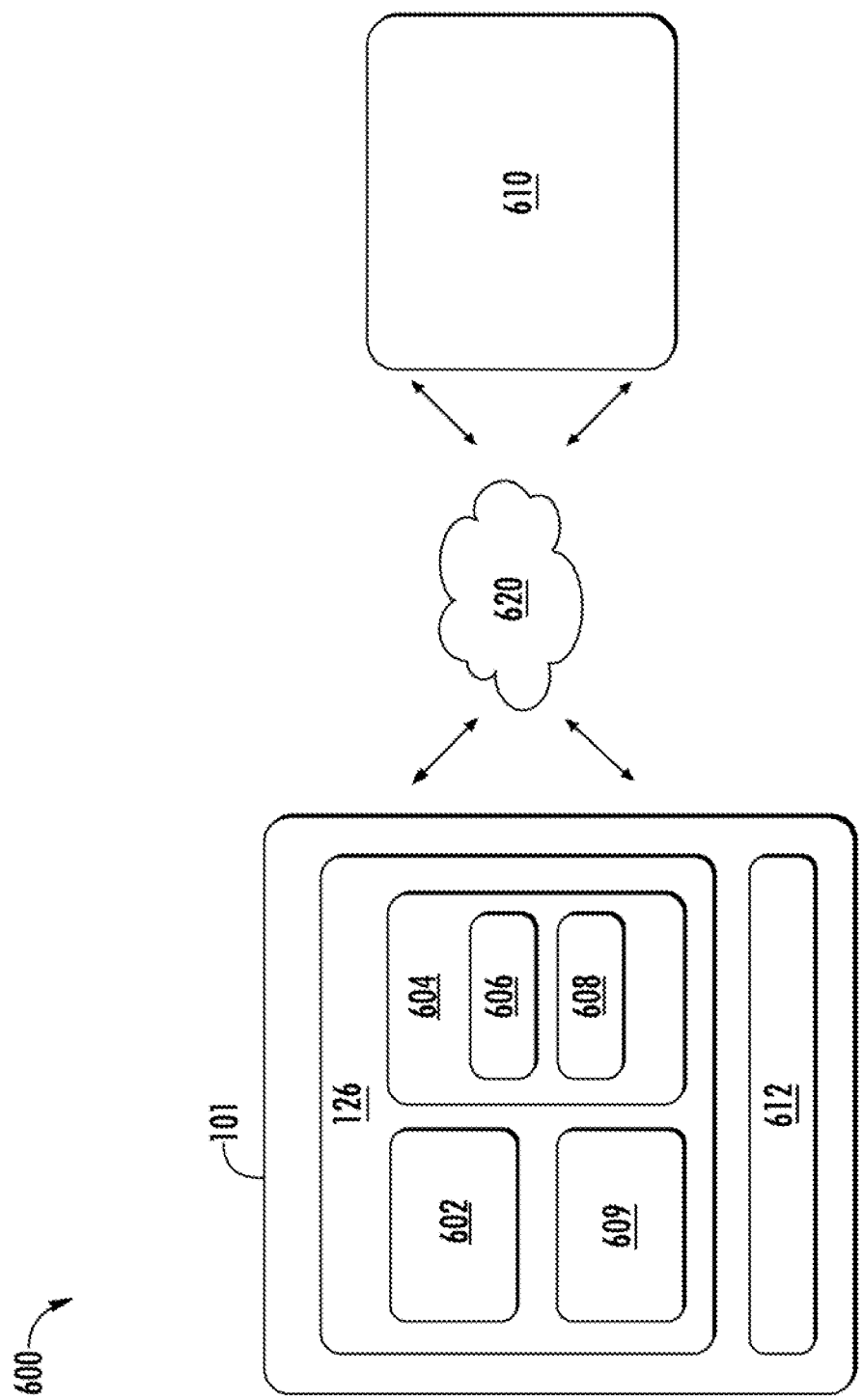
FIG. 6 depicts example system components according to example embodiments of the present disclosure.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 101 of the vehicle 102 and, in some implementations, a remote computing system 610 including remote computing device(s) that is remote from the vehicle 102 (e.g., the operations computing system 104) that can be communicatively coupled to one another over one or more networks 620. The remote computing system 610 can be associated with a central operations system and/or an entity associated with the vehicle 102 such as, for example, a vehicle owner, vehicle manager, fleet operator, service provider, etc.

The computing device(s) 126 of the vehicle computing system 101 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 102 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 on-board the vehicle 102 cause the one or more processors 602 (the computing system 101) to perform operations such as any of the operations and functions of the computing device(s) 126 or for which the computing device(s) 126 are configured, as described herein, the operations for controlling an autonomous vehicle based on a passenger-initiated action (e.g., one or more portions of method 500), and/or any other functions for controlling an autonomous vehicle based on a passenger-initiated action, as described herein.

The memory 604 can store data 608 that can be obtained, received, accessed, written, manipulated, created, and/or stored. The data 608 can include, for instance, passenger data, data associated with sensor signals, data associated with status change(s), data associated with a time window, data associated with vehicle actions, and/or other data/information as described herein. In some implementations, the computing device(s) 126 can obtain data from one or more memory device(s) that are remote from the vehicle 102.

The computing device(s) 126 can also include a communication interface 609 used to communicate with one or more other system(s) on-board the vehicle 102 and/or a remote computing device that is remote from the vehicle 102 (e.g., of remote computing system 610). The communication interface 609 can include any circuits, components, software, etc. for communicating with one or more networks (e.g., 620). In some implementations, the communication interface 609 can include including for example, one or more of a communications controller, receiver, transceiver, transmitter, port, conductors, software and/or hardware for communicating data.

In some implementations, the vehicle computing system 101 can further include a positioning system 612. The positioning system 612 can determine a current position of the vehicle 102. The positioning system 612 can be any device or circuitry for analyzing the position of the vehicle 102. For example, the positioning system 612 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 101.

The network(s) 620 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 101. The remote computing devices can include components (e.g., processor(s), memory, instructions, data) similar to that described herein for the computing device(s) 126. Moreover, the remote computing system 610 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of controlling an autonomous vehicle based on a passenger-initiated action, comprising:
    detecting, by a computing system comprising one or more computing devices on-board the autonomous vehicle, a first status change of a vehicle door, wherein the first status change is associated with a first user action associated with the vehicle door;
    detecting, by the computing system, a second status change of the vehicle door within a time window that begins upon the detection of the first status change, wherein the second status change is associated with a second user action associated with the vehicle door, the first user action and the second user action being performed by one or more passengers of the autonomous vehicle;
    determining, by the computing system, one or more vehicle actions based at least in part on at least one of the first status change or the second status change associated with the vehicle door; and
    providing, by the computing system, one or more control signals to one or more systems on-board the autonomous vehicle to implement the vehicle actions.

2. The computer-implemented method of claim 1, wherein the first user action comprises a first actuation of an interface associated with the vehicle door and the second user action comprises a second actuation of the interface that is subsequent in time to the first actuation.

3. The computer-implemented method of claim 2, wherein the interface is a handle associated with the vehicle door.

4. The computer-implemented method of claim 1, wherein the first status change is associated with the vehicle door changing from a locked state to an unlocked state.

5. The computer-implemented method of claim 1, wherein the second status change is associated with the vehicle door changing from a closed state to an open state.

6. The computer-implemented method of claim 1, wherein the one or more vehicle actions comprise stopping a motion of the autonomous vehicle.

7. The computer-implemented method of claim 1, wherein the one or more vehicle actions comprise steering the autonomous vehicle out of a current travel lane.

8. The computer-implemented method of claim 1, wherein the one or more vehicle actions comprise one or more intermediate vehicle actions based at least in part on the first status change associated with the vehicle door.

9. The computer-implemented method of claim 8, wherein the one or more intermediate vehicle actions comprise decelerating the autonomous vehicle.

10. The computer-implemented method of claim 1, further comprising:
receiving, by the computing system, passenger data associated with at least one of the one or more passengers of the autonomous vehicle, wherein the passenger data is indicative of a status change associated with at least one of a seat belt of the passenger and a seat of the passenger.

11. A computing system for controlling an autonomous vehicle based on a passenger-initiated action, comprising:
one or more processors on-board the autonomous vehicle; and
one or more tangible, non-transitory, computer readable media on-board the autonomous vehicle that collectively store instructions that when executed by the one or more processors cause the computing system to perform operations, the operations comprising:
detecting a first status change associated with a vehicle door, wherein the first status change is associated with a first user action performed by one or more passengers of the autonomous vehicle;
detecting a second status change associated with the vehicle door within a time window that begins upon the detection of the first status change, wherein the second status change is associated with a second user action performed by one or more passengers of the autonomous vehicle;
determining one or more vehicle actions based at least in part on at least one of the first status change or the second status change associated with the vehicle door; and
providing one or more control signals to implement the vehicle actions.

12. The computing system of claim 11, wherein detecting the first status change associated with the vehicle door comprises:
receiving a sensor signal from a sensor associated with the vehicle door, the sensor signal indicative of the first status change associated with the vehicle door.

13. The computing system of claim 11, wherein detecting the second status change associated with the vehicle door within the time window comprises:
receiving a sensor signal from a sensor associated with the vehicle door within the time window, the sensor signal indicative of the second status change associated with the vehicle door.

14. The computing system of claim 11, wherein the one or more vehicle actions comprise decelerating the autonomous vehicle to a stopped position that is located out of a current travel lane of the autonomous vehicle.

15. The computing system of claim 11, wherein the one or more vehicle actions comprise one or more intermediate vehicle actions based at least in part on the first status change associated with the vehicle door.

16. An autonomous vehicle comprising:
a vehicle door;
one or more on-board systems;
one or more processors; and
one or more tangible, non-transitory, computer readable media that collectively store instructions that when executed by the one or more processors cause the one or more processors to perform operations, the operations comprising:
detecting a first status change of the vehicle door, wherein the first status change is associated with a first actuation of an interface associated with the vehicle door;
detecting a second status change of the vehicle door within a time window that begins upon the detection of the first status change, wherein the second status change is associated with a second actuation of the interface associated with the vehicle door;
determining one or more vehicle actions based at least in part on at least one of the first status change and the second status change associated with the vehicle door; and
providing one or more control signals to the one or more systems on-board the autonomous vehicle to implement the vehicle actions.

17. The autonomous vehicle of claim 16, wherein the first actuation and the second actuation are associated with one or more passengers of the autonomous vehicle, wherein the vehicle actions comprise sending a communication to a remote computing device associated with the operation of the autonomous vehicle, and wherein the communication requests that a human operator contact the one or more passengers.

18. The autonomous vehicle of claim 17, wherein the autonomous vehicle is traveling in an autonomous mode when the second status change is detected, and wherein the one or more vehicle actions comprise decelerating the autonomous vehicle to a stopped position.

19. The autonomous vehicle of claim 18, wherein the operations further comprise:
determining that one or more passengers have not exited the autonomous vehicle within a second time window that begins upon the detection of the second status change and that the vehicle door is closed; and
providing one or more control signals to cause the autonomous vehicle to resume traveling in the autonomous mode.

20. An autonomous vehicle comprising:
a vehicle door;
one or more on-board systems;
one or more processors; and
one or more tangible, non-transitory, computer readable media that collectively store instructions that when executed by the one or more processors cause the one or more processors to perform operations, the operations comprising:
detecting a first status change of the vehicle door, wherein the first status change is associated with a first actuation of an interface associated with the vehicle door;
detecting a second status change of the vehicle door, wherein the second status change is associated with a second actuation of the interface associated with the vehicle door, wherein the first actuation and the second actuation are associated with one or more passengers of the autonomous vehicle riding for a transportation service;
determining one or more vehicle actions based at least in part on at least one of the first status change and the second status change associated with the vehicle door; and
providing one or more control signals to the one or more systems on-board the autonomous vehicle to implement the vehicle actions, wherein the one or more vehicle actions comprise sending a communication to a remote computing device associated with the operation of the autonomous vehicle, and wherein the communication indicates that there has been a change associated with the autonomous vehicle.

* * * * *